E. B. BENNETT.
AMALGAMATOR.
APPLICATION FILED NOV. 23, 1914.

1,157,836.

Patented Oct. 26, 1915.
2 SHEETS—SHEET 1.

WITNESSES:
Chester P. Dennhardt

INVENTOR,
Erastus B. Bennett
BY
ATTORNEY.

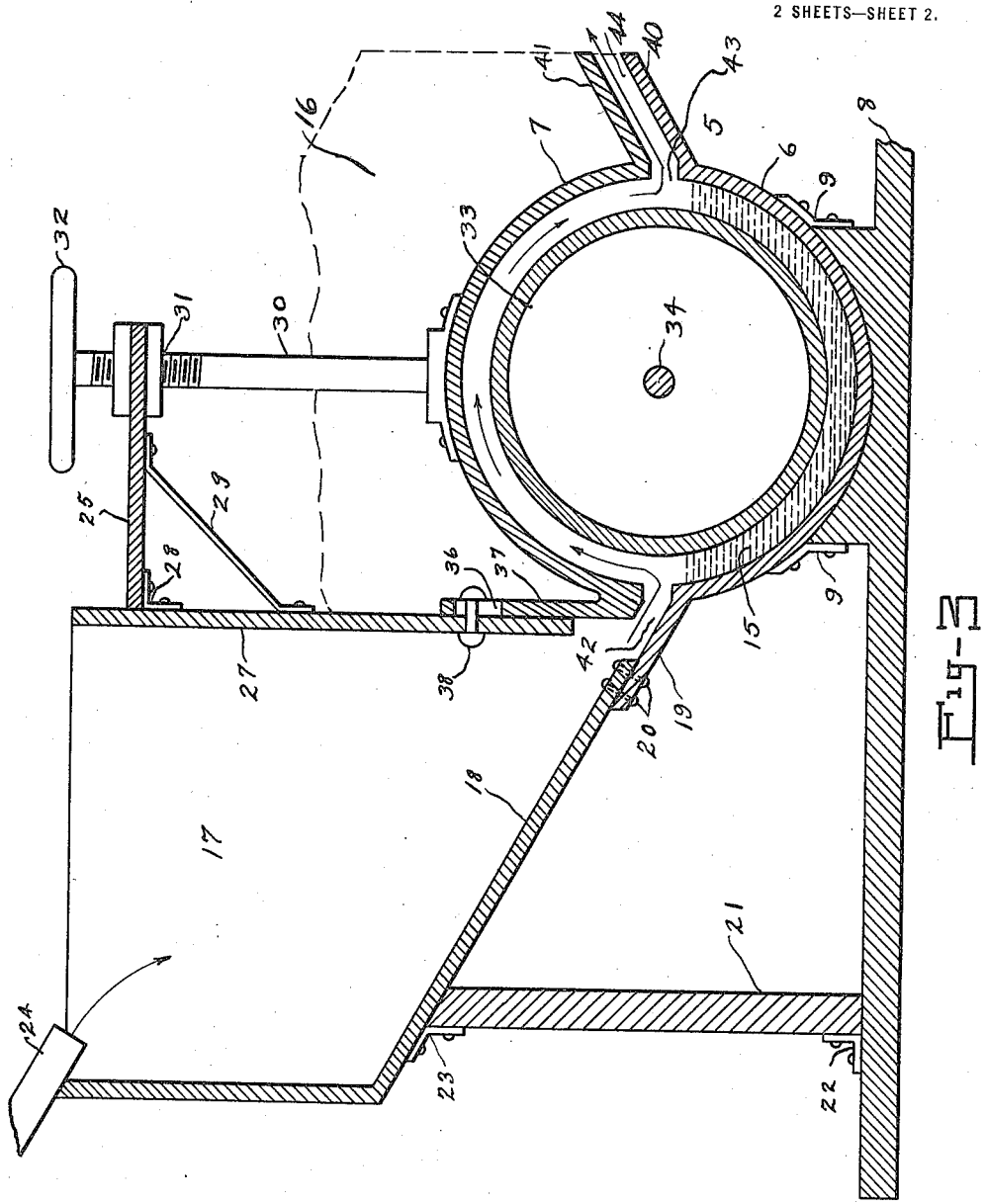

UNITED STATES PATENT OFFICE.

ERASTUS B. BENNETT, OF DENVER, COLORADO.

AMALGAMATOR.

1,157,836. Specification of Letters Patent. Patented Oct. 26, 1915.

Application filed November 23, 1914. Serial No. 873,491.

*To all whom it may concern:*

Be it known that I, ERASTUS B. BENNETT, a citizen of the United States, and resident of the city and county of Denver, State of Colorado, have invented certain new and useful Improvements in Amalgamators; and I do declare the following to be a full, clear, and exact description of my invention, such as will enable others skilled in the art to which it appertains to make and use the same, reference being had to the accompanying drawings, and to the figures of references marked thereon, which form a part of this specification.

My invention relates to improvements in amalgamators and has for its principal object the provision of a machine of that character for effectively saving or recovering gold or other metals from ores.

Another object of the invention is to provide a machine which will admit of adjustment and regulation in accordance with the particular conditions or character of the ore to be treated.

Another object of the invention is to provide an extremely simple, efficient and effective machine of the character set forth, embodying cheapness in manufacture and operation.

With these and other objects in view, which will become apparent in the following detail explanation of the invention, I will proceed to describe the invention with reference to the accompanying drawings.

Figure 1:
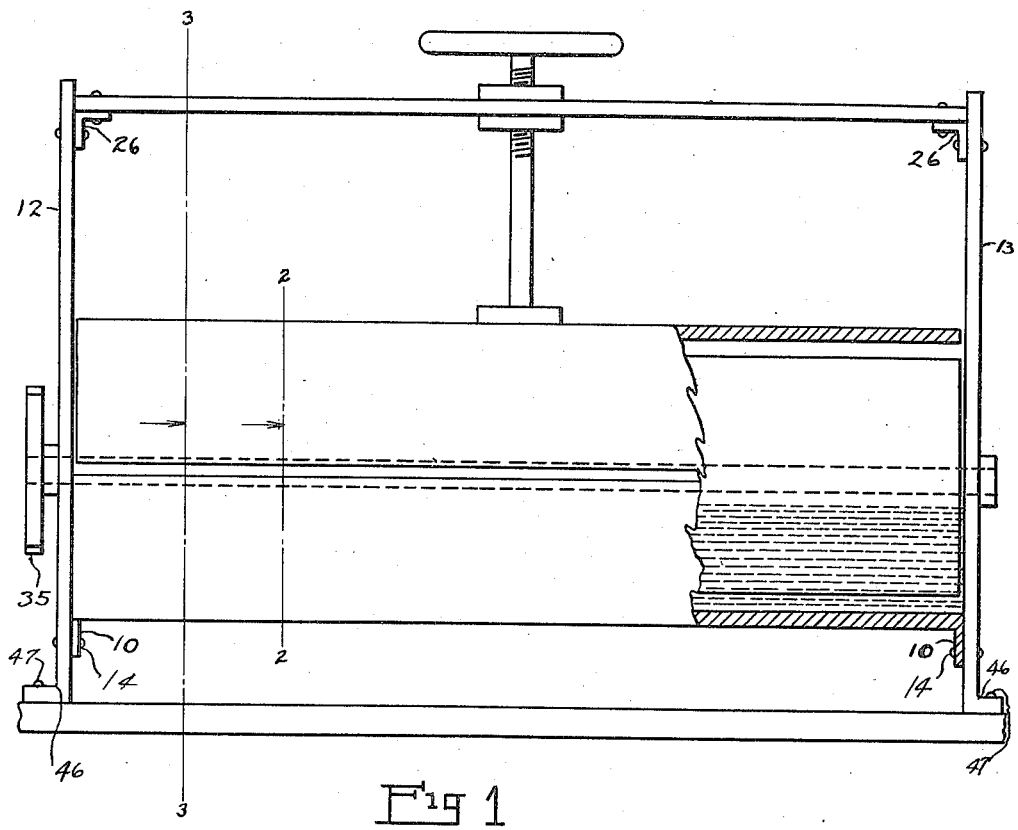
Figure 2:
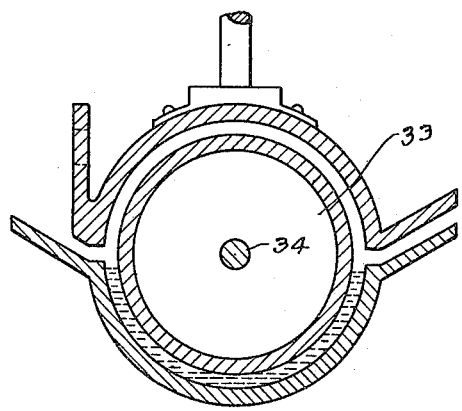

In these drawings, Figure 1 is an elevational view of the machine, partially in section; Fig. 2 is a cross section view of the machine taken on the line 2—2, Fig. 1, looking in the direction of the arrow; Fig. 3 is a cross section view of the machine taken on the line 3—3, Fig. 1, looking in the direction of the arrow.

Corresponding and like parts are referred to in the following description and indicated in all the views of the accompanying drawings by the same reference characters.

Let the numeral 5 designate an amalgamating chamber in its entirety, the same being composed of two circular members 6 and 7, which when in their operative or assembled position form a cylindrical amalgamating chamber. The member 6 is permanently stationary and is mounted upon and secured to a base 8, the latter being recessed to receive the curved surface of the said member 6. Fastening members 9 firmly secure and hold the said member 6 to the base 8. The opposite extremities of the member 6 are flared outwardly at right angles to the body of said member, forming flanges 10, which engage closely with the opposite side members 12 and 13, the said flanges being connected with said side members by bolts, or other suitable fastening devices 14, whereby the side plates or members 12 and 13 form closures for the opposite extremities of the member 6, making a closed chamber for the retention of mercury 15. It will be understood that when the two members 6 and 7 are in their proper relative and operative position, they form a cylindrical chamber, through which chamber the ore is adapted to pass while being treated. Thus, by virtue of the shape of the two parts 6 and 7, the lower, or permanently stationary part or member 6 forms a chamber in which the mercury is retained, while the upper member 7 forms a chamber through which the ore passes, as will appear more fully hereinafter. The side members 12 and 13 extend above the amalgamating chamber 5, as shown at 16, and also serve to close the extremities of the upper member 7, thereby forming the chamber for the passage of the ore. The upper member 7 is vertically adjustable between the side members 12 and 13, and it is for this purpose that the said sides 12 and 13 are extended above the top of the amalgamating chamber 5, thereby permitting the said upper member 7 to be raised, sufficiently for all purposes, without disengaging the said upper member 7 from said side members, or without raising said upper member above said side members to such an extent as to allow the ore or material to escape at the ends of the chamber formed by said upper member. The side members 12 and 13 also form the sides of an ore bin or feed chamber 17, the said sides being extended to form the end closures of the amalgamating chamber 5, as described in the foregoing. This ore bin or feed chamber 17 is provided with an inclined bottom 18, the lower edge of which is secured to an upwardly inclined lip or flange 19 formed integral with the lower member 6, of the amalgamating chamber, by means of bolts or other suitable fastening devices 20. This bin or feed chamber 17 is braced and supported upon the base 8 by means of vertical beams 21, secured at their opposite extremities to said base and the rear edge of the said bin or feed chamber, as respectively shown at 22 and 23. The ore, or material is fed into said bin or feed chamber 17 through a suitable chute 24.

A member 25 is extended parallel with the amalgamating chamber 5 above the latter, the opposite extremities of said member 25 being secured to said side members 12 and 13, by means of angle irons 26, and the inner edge of said member 25 being secured to the end member 27 of the feed chamber 17 by means of a similar angle iron 28, braces 29 also connecting the said member 25 with the end member 27 of the feed chamber. An adjusting hand screw 30 is threaded through this member 25, as shown at 31, the lower extremity of the said screw 30 being connected with the upper member 7 of the amalgamating chamber 5. Thus, by operating the hand wheel 32, of said screw 30, the upper member 7 may be raised or lowered, as may be desired, for purposes hereinafter disclosed.

A hollow amalgamating roll 33 is journaled on the interior of the amalgamating chamber 5 by means of an axle 34, upon which the said amalgamating roll is made fast, the said axle having its opposite extremities journaled in the side members 12 and 13, and a sprocket wheel 35 being mounted upon one extremity of said axle on the exterior of the side member 12, power being transmitted through this sprocket wheel for revolving the amalgamating roll 33. The amalgamating roll 33 is of less diameter than the cylindrical amalgamating chamber 5 and does not entirely occupy all of the space within the amalgamating chamber. A portion of the amalgamating roll 33 is constantly immersed in the mercury 15, contained within the lower part 6 of the amalgamating chamber, the said mercury completely filling or occupying the entire space between the roll and the lower part of the amalgamating chamber, while the space between the roll and the upper member of the amalgamating chamber is left vacant and provides a passage for the ore through the amalgamating chamber 5. The inner edge of the upper member of the amalgamating chamber 5 is provided with an upwardly extended integral part which connects with the end member 27 of the feed chamber 17 in an adjustable manner, the said connection being formed by fastening devices passed through the said end member 27 and vertical slots 36 formed in the upwardly extended part, the said part being designated 37, and the fastening devices being designated 38. Thus, by virtue of this arrangement, the upper member 7 may be raised and lowered in order to vary the size of the ore passage between the amalgamating roll 33 and the upper member 7 of the amalgamating chamber 5, the raising and lowering of said upper member 7 being accomplished by operating the screw 30, as described in the foregoing.

The outer edges of both the lower member 6 and upper member 7 are provided with integrally formed upwardly extended lips 40 and 41 respectively, the said lips forming a discharge passage for the ore, which passage communicates with the space or passage for the ore through the amalgamating chamber 5.

Now, in operation, the ore will pass from the ore chamber 17 through the longitudinal opening 42, formed by the separation of the two parts 5 and 6 of the amalgamating chamber 5, into the latter, taking the course through the ore passage of the latter as indicated by the arrows and finally being discharged through the longitudinally arranged opening 43, on the opposite side of the amalgamating chamber, and similarly formed by the separation of the two members of the latter. This opening 43 is in communication with the upwardly inclined chute, designated 44, and formed by the lips 40 and 41. The amalgamating roll 33 is, of course, revolving while the ore is passing through the ore passage of the amalgamating chamber, and said roll is constantly taking up, or having applied thereto a fresh coat of mercury, in which the gold carried by the ore collects while the ore is passing through said ore passage.

The lip 19 is downwardly inclined to the longitudinal opening 42, whereby the ore is directed through said opening into the ore passage of the amalgamating chamber, while the lips 40 and 41 which form the discharge chute 44 are upwardly inclined, necessitating that the ore be forced through said chute by the pressure of the ore itself. Both the intake opening 42 and the discharge opening 43 extend the entire length of the amalgamating chamber 5, enabling an even distribution of the ore in the amalgamating chamber 5 and subjecting the latter to contact with the amalgamating roll 33, whereby a greater efficiency in recovery of the metal is obtained.

The lower edges of the side members 12 and 13 are turned at right angles, as shown at 46, and fastening devices 47 are passed through said right angular parts of said side members into the base 8, whereby said side members are firmly secured to the base.

While I have described and illustrated herein a specific form of my invention it is understood that I am not limited thereto and that the same may be modified and varied without departing from the spirit of my invention or the scope of the appended claims.

Having thus described my invention, what I claim and desire to secure by Letters Patent is:

1. An amalgamator, consisting of two semi-circular members, arranged in conjunction with each other to form a circular chamber, said members being normally separated to form longitudinal openings the entire length of said chamber on opposite sides of the latter for the intake and discharge of the ore to be treated, an amalgamating roll journaled in said chamber, and one of said semi-circular members being adjustable to vary the size of said intake and discharge openings, a space being provided between said amalgamating roll and one of said semi-circular members for the passage of the ore through said chamber.

2. An amalgamating machine, consisting of two semi-circular members, relatively arranged to form an amalgamating chamber, said semi-circular members being separated from engagement with each other to form longitudinally arranged intake and discharge openings the entire length of said amalgamating chamber on opposite sides of the latter, an amalgamating roll journaled in said amalgamating chamber, one edge of one of said semi-circular members being provided with a lip inclined toward the intake opening, while both of said semi-circular members are provided with lips on their edges adjacent the discharge opening, the said lips last named being upwardly inclined and forming a discharge chute for the ore, and a space being provided between said amalgamating roll and one of said semi-circular members forming an ore passage with which said openings communicate.

3. An amalgamator, consisting of two semi-circular members relatively arranged to form a circular amalgamating chamber, the said semi-circular members being disposed in separated condition to form intake and discharge openings extending the entire length of the said circular chamber on opposite sides of the latter, an amalgamating roll journaled in said semi-circular member, one of said semi-circular members forming a mercury retaining chamber adapted to retain the mercury in contact with said amalgamating roll, the opposite edges of said last named semi-circular member having upwardly and outwardly inclined lips, one of said lips forming a guide for the ore into the intake opening, one edge of the other semi-circular member having a lip correspondingly upwardly and outwardly inclined and coöperating with the other lip of the last named semi-circular member to form an ore discharge chute communicating with the said ore discharge opening, and a space being provided between said amalgamating roll and one of said semi-circular members forming an ore passage through said circular chamber and over said amalgamating roll.

4. An amalgamator, consisting of a hollow cylindrical member, said member being composed of two parts longitudinally separated to form an intake opening and a discharge opening, the said amalgamator having an ore feeding chamber in communication with the intake opening, one of said parts being stationary, the other part having a member integrally formed thereon adjacent said intake opening and adjustably connected with the wall of said ore feeding chamber, an amalgamating roll journaled in the hollow of said cylindrical member, a space being provided between the said roll and the last named part of said cylindrical member for the passage of the ore through the hollow of said cylindrical member, and an operative connection between said last named part and said wall of the ore feeding chamber for vertically adjusting said last named part to vary said space.

5. An amalgamator, consisting of a hollow cylindrical member, said member being composed of two parts longitudinally separated to form intake and discharge openings on opposite sides of said cylindrical member, one of said parts being stationary, while the other part is adjustable in relation thereto, said last named part having a member vertically disposed, a member with which said vertically disposed member is connected in movable relation, an amalgamating roll journaled in the hollow of said cylindrical member, a space being provided between said amalgamating roll and said adjustable part, and means for vertically adjusting said adjustable part to vary said space.

In testimony whereof, I affix my signature in the presence of two witnesses.

ERASTUS B. BENNETT.

Witnesses:
 CHESTER P. DENNHARDT,
 JNO. G. POWELL.

Copies of this patent may be obtained for five cents each, by addressing the "Commissioner of Patents, Washington, D. C."